| United States Patent [19] | [11] | 4,157,115 |
|---|---|---|
| Kalfoglou | [45] | Jun. 5, 1979 |

[54] LIGNOSULFONATES AS ADDITIVES IN RECOVERY PROCESSES INVOLVING CHEMICAL RECOVERY PROCESSES

[75] Inventor: George Kalfoglou, Houston, Tex.

[73] Assignee: Texaco Inc., White Plains, N.Y.

[21] Appl. No.: 850,114

[22] Filed: Nov. 10, 1977

Related U.S. Application Data

[63] Continuation-in-part of Ser. No. 591,573, Jun. 30, 1975, abandoned, and Ser. No. 715,957, Aug. 19, 1976, abandoned.

[51] Int. Cl.² ............................................. E21B 43/22
[52] U.S. Cl. ..................................... 166/274; 166/273; 166/275; 252/8.55 D
[58] Field of Search ........................ 166/273, 274, 275; 252/8.55 D

[56] References Cited

U.S. PATENT DOCUMENTS

| 2,792,894 | 5/1957 | Graham et al. ................... 166/274 X |
| 3,384,171 | 5/1968 | Parker .................................... 166/274 |
| 3,469,630 | 9/1969 | Hurd et al. ....................... 166/273 X |
| 3,476,188 | 11/1969 | Harvey ................................. 166/274 |
| 3,508,612 | 4/1970 | Reisberg et al. ..................... 166/274 |
| 3,700,031 | 10/1972 | Germer, Jr. et al. ............. 166/273 X |
| 3,797,574 | 3/1974 | Feuerbacher ........................ 166/274 |
| 3,811,504 | 5/1974 | Flournoy et al. .................... 166/273 |
| 3,858,656 | 1/1975 | Flournoy et al. .................... 166/274 |
| 3,977,471 | 8/1976 | Gale et al. ............................ 166/273 |
| 4,018,278 | 4/1977 | Shupe .......................... 252/8.55 D X |

*Primary Examiner*—Stephen J. Novosad
*Assistant Examiner*—George A. Suchfield
*Attorney, Agent, or Firm*—Carl G. Ries; Thomas H. Whaley; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of lignosulfonate salt as a sacrificial agent to inhibit the deposition of surfactant on the reservoir matrix. The process may best be carried out by injecting the lignosulfonates into the formation through the injection well mixed with a surfactant solution. This mixture would then be followed by a drive fluid such as water to push the chemicals to the production well. The surfactant solution comprises a mixture of petroleum sulfonate and an alkyl benzene alkoxylated sulfonate. In another embodiment, the surfactant solution comprises sulfonated alkoxylated alkyl surfactants and/or alkyl benzene alkoxylated sulfonates.

4 Claims, No Drawings

LIGNOSULFONATES AS ADDITIVES IN RECOVERY PROCESSES INVOLVING CHEMICAL RECOVERY PROCESSES

This application is a continuation-in-part of application Ser. No. 591,573 filed June 30, 1975, now abandoned, and application Ser. No. 715,957 filed Aug. 19, 1976, now abandoned.

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65-90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution affecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants, as will be discussed later, have been discovered to have special properties useful in water flooding operations such as a tolerance for high salinity and calcium, and/or magnesium ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the growth portion of the reservoir which is swept and unswept by the injected fluid. A major cause of poor sweep efficiency is associated with the fact that the injected fluid generally has a lower viscosity than the displaced fluid or petroleum. Thus, the injected fluid has a higher mobility and tends to finger through the oil thus prematurely breaking through to the production well.

The solution to this high mobility problem is to increase the viscosity of the driving fluid. One way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increased sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,424,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with saline solution of a surfactant having both a high and a low molecular weight component. These materials have not been completely satisfactory from a standpoint of performance and economics however.

U.S. Pat. No. 3,384,171 to Parker discloses that lignosulfonates may be used as a preflush followed by a surfactant solution. While this method provides an improvement over using surfactant alone, my invention provides an unexpected improvement in oil recovery over the process of Parker.

U.S. Pat. No. 3,700,031 refers to lignosulfonate as a sacrificial agent for alkylaryl sulfonate.

SUMMARY OF THE INVENTION

The invention is a process of producing petroleum from subterranean formation having an injection well and a production well in communication therewith. The process comprises injecting into the formation via the injection well an aqueous solution of lignosulfonate salts in admixture with surfactant solutions of alkyl benzene alkoxylated sulfonates and/or sulfates, sulfonated or sulfated alkoxylated alkyl surfactants, mixtures of petroleum sulfonates and alkyl benzene alkoxylated sulfonates or sulfates. Mixtures of petroleum sulfonates and alkoxylated alkyl sulfonates or sulfate or, mixtures of petroleum sulfonates and alkoxylated organic alcohols or organic alcohols and petroleum sulfonates alone. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extent of adsorption of the more expensive chemical oil recovery agent injected therebehind. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional groups on the sacrificial agent molecules enhance adsorption either by hydrogen bonding or electrostatic attraction to active sites on the rock surfaces.

A satisfactory sacrificial material has at least three important characteristics. First, it should be less expensive than the surfactant on cost effectiveness basis since it is to be sacrificed or adsorbed by the formation, probably not to be recovered. Next, it must be adsorbed readily by the subterranean formation matrix. Preferably the sacrificial material should be adsorbed more readily than the chemical oil recovery agent to be used in the process. The third important characteristic of a sacrificial agent is that the presence of such adsorbed sacrificial material should retard or eliminate adsorption of the surfactant and/or polymer chemical recovery material on the adsorption site of the formation rock. By adsorption sites of the formation rock is meant those parts of the surfaces of the pores of the formation rock capable of adsorbing a chemical compound from a solution on contact.

The sacrificial material may not have a detrimental effect on the recovery efficiency of the chemical flooding operation. Additional oil is usually recovered only if the sacrificial material is followed by or is admixed with a surfactant and/or a polymer chemical recovery agent which will effectively increase the amount of oil displaced from the subterranean formation. When the surfactant is chosen as the chemical recovery agent it should be injected in admixture with the sacrificial agent and ahead of the following flooding water thereby achieving the desired interfacial tension reduction between the injected fluid and the displaced fluid with minimal loss of surfactant on the formation matrix. The surfactant may be present in a hydrocarbon solvent or in an aqueous solution or in a combination thereof.

In one embodiment of my invention the surfactant comprises an aqueous solution of alkyl benzene alkoxylated sulfonates or sulfates having the following general formulae:

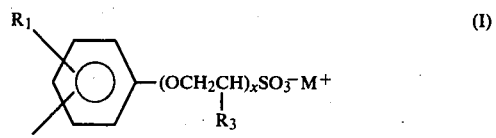

(I)

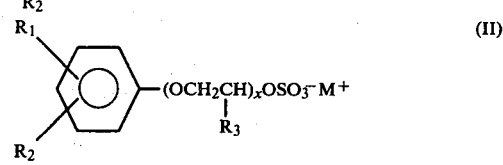

(II)

wherein
$R_1$ and $R_2$ are hydrogen or alkyl with at least one being an alkyl group of from 6 to 20 carbon atoms,
x is a number from 1 to 10,
$M^+$ is a cation selected from the group consisting of sodium, potassium, lithium, and ammonium,
$R_3$ is either $-CH_3$ or hydrogen.

In another embodiment of my invention the surfactant comprises an aqueous solution of sulfonated or sulfated alkoxylated alkyl surfactants having one of the following general formulae:

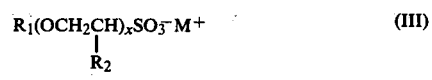

(III)

or

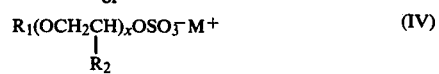

(IV)

where
$R_1$ is an alkyl group of from 8 to 22 carbon atoms,
$R_2$ is either $CH_3$ of hydrogen, and
x is a number from 1 to 10.

In another embodiment of my invention the surfactant comprises an aqueous solution of a mixture of petroleum sulfonates and solubilizers or formulas I–IV above.

In another embodiment of my invention the surfactant comprises petroleum sulfonate or a mixture of petroleum sulfonate and a water soluble organic alcohol or a mixture of petroleum sulfonate and an organic alcohol which has been alkoxylated and which displays amphiphilic properties.

The amount of surfactant which must be employed in the practice of any chemical flood is generally known in the art and is to be found in published literature. However, the slug size of surfactant generally will range from about 0.01 to 1 pore volumes of an aqueous surfactant solution having dissolved therein from about 0.01 to about 10.0 percent by weight of the surfactant itself.

In my invention the sacrificial agent is injected in admixture with the surfactant slug into the petroleum formation. This surfactant sacrificial agent mixture may or may not be preceded by a slug of sacrificial material only.

In any of these embodiments and others which are obvious to those skilled in the art, the surfactant containing slug may be followed by a material to taper the viscosity before drive water is injected. This technique known well to those skilled in the art prevents the water from fingering into the more viscous surfactant containing slug.

A specific embodiment of this invention, a sacrificial material comprising lignosulfonate salts, is injected via the suitable injection means, i.e., through one or more injection wells completed in the subterranean hydrocarbon formation, in admixture with a surfactant solution. By injecting the sacrificial material and surfactant together oil recovery is maximized. As shown by the data below, the oil recovery is greater than preflushing the formation with sacrificial agent and following with surfactant solution.

The sacrificial agents useful in the process of my invention are lignosulfonate salts. Lignosulfonates are anionic polyelectrolytes soluble in water and tolerate hard water (polyvalent ions, e.g. calcium and magnesium). They are also thermally stable in formations where the temperature is high. Lignosulfonates are macromolecules built up by complex condensation of phenyl propane units. The sulfonate groups are attached to the aliphatic side chain, mainly to alpha carbon. Lignosulfonates are water soluble with molecular weights ranging from several thousand to about 50,000 or more. They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonates will be inert towards the anionic surfactants in the flood water and therefore loss of surfactants to the rock surfaces will be kept to a minimum. The same phenomenon will occur with the polymer thickened drive fluid.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirth-Othmer Encyclopedia of Chemical Technology, Second Edition, Vol. 12, beginning at page 362. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including but not limited to West Virginia Pulp and Paper Company under the trade name REAX 80's. Their general method of preparation is described in the Encyclopedia of Chemical Technology referred to above. Briefly, sulfonated alkali lignins are prepared by cooking wood-chips with a 10% solution of a mixture of sodium hydroxide with about 20 mole percent of sodium sulfide. The lignin with wood is modified into a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN. These alkali lignins are used to prepare the sulfonated derivatives. Methods of sulfonation are known by those skilled in the art. One typical method involves treating the alkali lignins with a solution of alkali sulfites at elevated temperatures and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the material from woody products it is proper to call them sulfonated alkali lignins. Likewise since sulfite lignins emerge from the extraction process already sulfonated it is proper to refer to this class of materials as sulfite lignins or sulfite lignosulfonates.

Modified sulfonated alkali lignins and sulfite lignosulfonates, such as those with ring sulfomethylation, oxidation, ethoxylation, formaldehyde condensation, phenolation, and/or carboxylation are also useful as sacrificial agents. Lignosulfonates having degrees of sulfonation from about 2.0 to saturation are acceptable for my invention. Cations which are acceptable include $Na^+$, $K^+$, $NH_4^+$, $Ca^{++}$ and $Mg^{++}$. The degree of sulfonation is the weight percentage of sulfonate ($SO_3^-$) compared to the total molecular weight.

The quantity of sacrificial lignosulfonate materials to be injected into the subterranean hydrocarbon formation may be any amount up to and including an amount sufficient to occupy substantially all of the active sites of the formation matrix. If less than the maximum amount is used, there will be a corresponding increase in the adsorption of surfactant from injection solution onto the formation matrix although the amount of increase will not be as great as in the case where the formation is completely free of sacrificial lignosulfonate salts. At a maximum, only the amount of sulfonate salts needed to completely occupy the active sites on the formation is needed. The detriment resulting from using excess lignosulfonate salt would be an increase in the cost of operating the oil recovery program.

The amount of sacrificial lignosulfonate salts needed in the process of the invention depends on the particular formation, the area or pattern to be swept and other formation characteristics. Those skilled in the art can determine the exact quantity needed to afford the desired amount of protection.

The effectiveness of this invention for reducing the adsorption of surfactant or polymer on formation rock and chemical flooding operations is demonstrated by the following examples which are presented by way of illustration and are not intended as limiting the spirit and scope of the invention as defined in the claims.

EXPERIMENTAL (When tradenames are used, their chemical composition is defined at Table XII following.) Various lignosulfonates and derivates were tested to determine whether they will improve the efficiency of oil recovery of a surfactant system from a pack.

Crushed Slaughter cores were used in limestone packs to study the ability of lignosulfonates to improve the efficiency of surfactant systems to recover tertiary oil from packs. The packs had water permeabilities of about 17 darcies and porosities about 0.5. The floods were performed under similar conditions using an injection rate equivalent to a frontal advance of about 15 ft/day.

The packs were initially saturated with field water (Mallet water, 70,000 ppm Total Dissolved Solids) and with Slaughter crude oil. They were then water flooded with Mallet water to a residual oil saturation. The surfactant slug was then injected followed by a solution of a polymer for mobility control. After polymer injection water flooding was resumed until completion of the flood. The results of the the tests are summarized in Tables I, II, III, IV and V. Table XII gives a chemical description of materials used. In the discussion, the tradenames are used for convenience.

Different types of lignosulfonates were incorporated in a dual surfactant system (0.4% Sulframin 1240+0.6% Sulfonated Surfonic N-40) at 1% concentration (Table I) and the systems were injected in crushed limestone packs. Tertiary oil recovery of Slaughter crude was determined at 77° F. The water composition of simulated Mallet produced water used is given in Table V. The surfactant system was injected as a slug (25% P.V.) and was followed by a slug (50% P.V.) of 0.1% Kelzan MF polymer solution for mobility control which was driven through by simulated Mallet produced water.

The lignosulfonates listed in Table I contributed to additional tertiary oil recovery, which indicated that they can be utilized as sacrificial agents in surfactant systems. The selection of the best candidate among the lignosulfonates described in Table VI will also depend on the salinity and hardness of water encountered in a particular formation, since these lignosulfonates have different salt tolerance.

Three lignosulfonates were tested as sacrificial agents in surfactant floods, where the salinity and hardness of brine used were very high (Table II). The composition of simulated Bob Slaughter Block connate water used is given in Table VII. Tertiary oil recovery was determined at 77° F. The single surfactant system (1% Alipal CO-436+1% lignosulfonate) was injected as a slug (20% P.V.) in a crushed limestone pack saturated with Slaughter crude, and was followed by a slug (50% P.V.) of 0.1% Kelzan MF polymer solution for mobility control which was driven through by simulated Bob Slaughter Block connate water. All three lignosulfonates contributed to additional tertiary oil recovery.

Two types of sulfonated alkali lignins were tested in a single surfactant system in crushed limestone packs saturated with Slaughter crude at Mallet water salinity, and their performance has been tabulated in Table III.

The sulfonated alkali lignins were incorporated in a single surfactant system [1% sodium dodecyl phenol polyoxyethylene (4 moles) sulfonate] at 1% concentration, and the systems were injected in crushed limestone packs. The tertiary oil recovery of Slaughter crude was determined at 77° F. The surfactant system was injected as a slug (25% P.V.) and was followed by a slug (50% P.V. ) of 0.1% Kelzan MF polymer solution for mobility control, which was driven through by simulated Mallet produced water. Both sulfonated alkali lignins contributed to additional tertiary oil recovery, which indicated that they can be utilized as sacrificial agents equally well as sulfite lignosulfonates in surfactant systems. The selection of the proper lignin sulfonate as sacrificial agent will depend on the salinity and hardness of water encountered in a particular formation.

The mineral nature and characteristics of rock surfaces in a porous medium play a major role in tertiary oil recovery process when surfactant flooding is employed. In Table IV, clayey sandstone packs were used to determine tertiary oil recovery by the surfactant system: 0.4% Sulframin 1240+0.6% sulfonated Surfonic N-40+1% lignosulfonate. The surfactant flooding process applied and the conditions in the packs were the same as those given in Table I. It was observed that both the flood containing no lignosulfonate and the ones containing lignosulfonates recovered less tertiary oil than the corresponding ones performed in crushed limestone packs. However, as before, the presence of lignosulfonate sacrificial agents increased oil recovery. The presence of clays contributed to lower tertiary oil recovery.

Table V demonstrates the improvement in oil recovery obtained by flooding with a mixture of lignosulfonates and surfactant in an aqueous solution over surfactant solutions alone as well as a preflush of lignosulfonate followed by surfactant.

In Case 1, a surfactant solution was injected into a previously water flooded limestone pack. This surfactant solution was followed by a polymer and the polymer was followed by brine water. The tertiary oil recovery by this method was 41 percent. The oil cut, that is, the largest fraction of oil produced with the water, was 22 percent. In Case 2, a solution of lignosulfonates was used as a preflush and was followed by a solution of the same surfactant as used in Case 1. This surfactant was followed by the same polymer used in Case 1 and the polymer was followed by water as in Case 1. In Case 2, the tertiary oil recovery was 55 percent and the oil cut was 27 percent.

In Case 3, the surfactant and lignosulfonate were mixed together and injected as a mixture. This mixture was followed by the same polymer used in the previously cases and the polymer was followed by water as in the previous cases. The tertiary oil recovery for Case 3 was 79 percent and the oil cut was 30 percent. Thus, the unexpected improvement of my invention is demonstrated.

All parameters were controlled as closely as possible to be constant throughout each flood. The crushed limestone packs were made to be as similar as possible and, of course, the same fluids were used from case to case where applicable.

It was concluded that both sodium and calcium lignosulfonates can be utilized as sacrificial agents in single and dual surfactant system floods in limestone and sandstone porous media. Certain lignosulfonates can tolerate very high salinity and hardness. Lignosulfonates are compatible with nonionic and/or anionic surfactant systems, and they are thermally stable at high temperatures.

Table VI demonstrates the effect of Lignosite 458 on the oil recovery capability of a surfactant system comprising two petroleum sulfonates and a solubilizer, which is nonyl phenol ethoxylated with 6 moles of ethylene oxide and sulfonated to the sodium salt. It is noted that the tertiary recovery when the lignosulfonate sacrificial agent is used is 76.9% whereas without the sacrificial agent the tertiary is 62.1%.

Table VII shows the results of a series of comparative runs wherein various single surfactants which were generally sodium dodecyl phenol polyoxyethylene sulfonates were used in surfactant floods in laboratory cores. It is noted that in every case the addition of the lignosulfonate sacrificial agent improved the oil recovery.

Table VIII demonstrates adsorption values of single surfactant systems as opposed to adsorption values of singe surfactant systems mixed with lignosulfonate sacrificial agents. These tests combine an aqueous solution of the surfactant with ground substrate and the milligrams of surfactant adsorbed per gram of substrate is indicative of the propensity of the surfactant to adsorb in a throughput oil recovery operation. It is noted that in every case the addition of the lignosulfonate sacrificial agent improves the adsorption values indicating that an improved oil recovery would be obtained.

Table IX shows the adsorption values of a petroleum sulfonate-solubilizer system compared with the same system with the addition of a lignosulfonate. It is noted that the addition of the lignosulfonate improved the adsorption value.

A comparison was made of the stability of a petroleum sulfonate-solubilizer system with and without the presence of lignosulfonates. An aqueous solution of two petroleum sulfonates and a 6 mole ethylene oxide adduct of nonyl phenol which had been sulfonated was the surfactant system used. The petroleum sulfonate components were 0.55% TRS 18 and 1.45% TRS 40. 0.6 percent of the ethoxylated sulfonate was used. Lignosite 458 was the lignosulfonate chosen as a sacrificial agent-stabilizer. These surfactant systems with and without Lignosite 458 were prepared at two salinities (100,000 ppm Total Dissolved Solids and 110,000 ppm Total Dissolved Solids). It was observed that the systems with no Lignosite 458 present phased out, whereas the systems with Lignosite 458 were stable. This indicates that lignosulfonates can also be used in petroleum sulfonate-solubilizer systems to enhance the phase stability of these systems and thus avoid using excessive solubilizer as stabilizer.

TABLE I

SACRIFICIAL AGENT TESTING
OIL RECOVERY FROM CRUSHED LIMESTONE PACKS AT 77° F.

Slaughter Crude
Surfactant System: (0.4% Sulframin 1240 + 0.6% Sulfonated Surfonic N-40 + 1.0% Sulfite Lignosulfonate) in simulated Mallet produced water (65,000 ppm TDS)
0.1% Kelzan MF in simulated Mallet produced water (65,000 ppm TDS)
Rate: 1cm/min.

| Lignosulfonate | Permeability of Pack to Water (Darcy) | % Pore Volume Surfactant Injected | % Pore Volume Polymer Injected | % Tertiary Oil Recovery |
|---|---|---|---|---|
| None | 26.3 | 25 | 50 | 62.8 |
| Marasperse C-21 | 19.4 | 25 | 50 | 97.1 |
| Marasperse N-22 | 20.3 | 25 | 50 | 97.8 |
| Marasperse BS-22-3 | 18.1 | 25 | 50 | 91.0 |
| Marasperse BS-22-6 | 15.4 | 25 | 50 | 81.1 |
| Marasperse 22s-z | 22.6 | 25 | 50 | 88.6 |
| Norlig 41s-2z | 20.3 | 25 | 50 | 71.1 |
| Lignosite | 12.4 | 25 | 50 | 73.0 |
| Lignosite 854 | 24.0 | 25 | 50 | 92.6 |
| Lignosite 458 | 20.2 | 25 | 50 | 95.3 |

TABLE II

SACRIFICIAL AGENT TESTING
OIL RECOVERY FROM CRUSHED LIMESTONE PACKS AT 77° F.

Slaughter Crude
Surfactant System: (1% Alipal CO-436 + 1% Sulfite Lignosulfonate) in simulated Bob Slaughter Block connate water (180,000 ppm TDS)
0.1% Kelzan MF in simulated BSB connate water (180,000 ppm TDS)
Rate: 1 cm/min.

| Lignosulfonate | Permeability of Pack to Water (Darcy) | % Pore Volume Surfactant Injected | % Pore Volume Polymer Injected | % Tertiary Oil Recovery |
|---|---|---|---|---|
| None | 50.8 | 20 | 50 | 60.0 |
| Marasperse BS-22-6 | 23.3 | 20 | 50 | 76.7 |
| Marasperse 22s-z | 50.4 | 20 | 50 | 79.4 |
| Norlig 41s-2z | 36.8 | 20 | 50 | 78.0 |

TABLE III

SULFONATED ALKALI LIGNINS AS SACRIFICIAL AGENTS
OIL RECOVERY FROM CRUSHED LIMESTONE PACKS AT 77° F.

Slaughter Crude
Surfactant System: [1% Sodium Dodecyl Phenol Polyoxyethylene (4 moles) Sulfonate + 1% Sulfonated Alkali Lignins] in simulated Mallet produced water (65,000 ppm TDS).
0.1% Kelzan MF in simulated Mallet produced water (65,000 ppm TDS)
Rate: 1 cm$^3$/min.

| Sulfonated Alkali Lignins | Permeability of Pack to Water (Darcy) | Pore Volume Surfactant Injected | % Pore Volume Polymer Injected | % Tertiary Oil Recovery |
|---|---|---|---|---|
| None | 22.8 | 25 | 50 | 54.8 |
| A* | 28.1 | 25 | 50 | 87.4 |

TABLE III-continued
SULFONATED ALKALI LIGNINS AS SACRIFICIAL AGENTS
OIL RECOVERY FROM CRUSHED LIMESTONE PACKS AT 77° F.

Slaughter Crude
Surfactant System: [1% Sodium Dodecyl Phenol Polyoxyethylene (4 moles) Sulfonate
+ 1% Sulfonated Alkali Lignins] in simulated Mallet produced
water (65,000 ppm TDS).
0.1% Kelzan MF in simulated Mallet produced water (65,000 ppm TDS)
Rate: 1 cm$^3$/min.

| Sulfonated Alkali Lignins | Permeability of Pack to Water (Darcy) | Pore Volume Surfactant Injected | % Pore Volume Polymer Injected | % Tertiary Oil Recovery |
|---|---|---|---|---|
| B* | 20.5 | 25 | 50 | 65.4 |

A: Sodium sulfonated alkali lignin (Degree of sulfonation = 13.5)
B: Sodium sulfonated alkali lignin (Degree of sulfonation = 17.5)

TABLE IV
SACRIFICIAL AGENT TESTING
OIL RECOVERY FROM CLAYEY SANDSTONE PACKS AT 77° F.

Slaughter Crude
Surfactant System: (0.4% Sulframin 1240 + 0.6% Sulfonated Surfonic N-40 + 1.0% Sulfite Lignosulfonate)
in simulated Mallet produced water (65,000 ppm TDS).
0.1% Kelzan MF in simulated Mallet produced water (65,000 ppm TDS).
Rate: 1 cm$^3$/min.

| Lignosulfonate | Permeability of Pack to Water (Darcy) | % Pore Volume Surfactant Injected | % Pore Volume Polymer Injected | % Tertiary Oil Recovery |
|---|---|---|---|---|
| None | 8.0 | 25 | 50 | 33.5 |
| Marasperse C-21 | 10.7 | 25 | 50 | 47.4 |
| Marasperse BS-22-3 | 6.2 | 25 | 50 | 40.0 |
| Marasperse BS-22-6 | 11.0 | 25 | 50 | 40.8 |
| Marasperse 22s-z | 10.0 | 25 | 50 | 40.1 |
| Norlig 41s-2z | 9.4 | 25 | 50 | 46.1 |

TABLE V

|  | CASE 1 | CASE 2 | CASE 3 |
|---|---|---|---|
| Injected Fluids In Order of Injection | 1. Surfactant * <br> 2. Polymer** <br> 3. Water | 1. Lignosulfonate *** <br> 2. Surfactant <br> 3. Polymer <br> 4. Water | 1. Lignosulfonate <br> 2. Polymer <br> 3. Water |
| Pack | Crushed Limestone | Crushed Limestone | Crushed Limestone |
| Permeability | 10,500 md | 16,700 md | 14,200 md |
| Injection Rate | 60 cc/hr | 60 cc/hr | 60 cc/hr |
| Tertiary Oil Recovery | 41% | 55% | 79% |
| Oil Cut | 22% | 27% | 30% |

*Sodium dodecyl tetraoxyethylene phenol sulfonate (1% solution in brine water)
** Kelzan MF (0.1% in brine water)
*** Sodium Lignosulfonate (1% solution in brine water)

TABLE VI
SACRIFICIAL AGENT TESTING OIL RECOVERY FROM SAND PACKS

Manvel Sand, Crude and Brine

| Surfactant System: Petroleum Sulfonate | | |
|---|---|---|
| Petroleum Sulfonate | TRS 40 | 1.45% |
| Petroleum Sulfonate | TRS 18 | 0.55% |
| Solubilizer Adduct N60CS (chain sulfonated 6 mole ethylene oxide adduct of nonyl phenol) | | 0.60% |
| Lignosulfonate: (when used) Lignosite 458 | | 2.60% |

Slug Sequence: Tertiary Oil Recovery

Test 1
1. 0.25 PV Surfactant System
2. 0.25 PV Polymer in 20% brine
3. 0.50 PV Polymer in 90% brine    62.1%

Test 2
1. 0.25 PV Surfactant System + Lignosulfonate
2. 0.25 PV Polymer in 20% brine
3. 0.50 PV Polymer in 90% brine    76.9%

TABLE VII
LIGNOSULFONATES AS ADDITIVES IN SURFACTANT FLOODS

Slaughter Crude    Slaughter Core
Surfactant System: Sodium dodecyl phenol polyoxyethylene sulfonate

| Surfactant System | Sacrificial Agent | Surfactant Slug Size (Vp) | Polymer Xanflood (ppm) | E. Tertiary Oil Recovery Efficiency |
|---|---|---|---|---|
| 1% Adduct D-40CS | — | 0.5 | 1000 | 0.43 |
| 1% Adduct D-40CS | 1% Lignosite 458 (Na Lignosulfonate) | 0.5 | 1000 | 0.53 |
| 1% Adduct D-40CS | 1% 225 - 49 A (Na salt of sulfonated lignin) | 0.5 | 1000 | 0.67 |

TABLE VII-continued
LIGNOSULFONATES AS ADDITIVES IN SURFACTANT FLOODS

Slaughter Crude   Slaughter Core
Surfactant System: Sodium dodecyl phenol polyoxyethylene sulfonate

| Surfactant System | Sacrificial Agent | Surfactant Slug Size (Vp) | Polymer Xanflood (ppm) | E. Tertiary Oil Recovery Efficiency |
|---|---|---|---|---|
| 1% Adduct D-40CS | 1.5% Lignosite 458 | 0.5 | 1000 | 0.76 |
| 3% Adduct D-25HPS | — | 0.5 | 1000 | 0.31 |
| 1% Adduct D-25HPS | 1.5% Lignosite 458 | 0.5 | 1000 | 0.65 |
| 1% Adduct D-35CS | — | 0.4 | 1000 | 0.54 |
| 1% Adduct D-35CS | 1.5% Lignosite 458 | 0.4 | 1000 | 0.77 |

TABLE VIII
ADSORPTION VALUES OF SINGLE SURFACTANT SYSTEM

| Surfactant System | Sacrificial Agent | mg surfactant g Slaughter Rock |
|---|---|---|
| 1% Adduct D-40CS | — | 2.9 |
| 1% Adduct D-40CS | 1.5% Lignosite 458 | 0.5 |
| 1% Alipal CO-433 | — | 2.8 |
| 1% Alipal CO-433 | 1.5% Lignosite 458 | 2.0 |
| 1% Sipex EST 75 | — | 1.8 |
| 1% Sipex EST 75 | 1.5% Lignosite 458 | 1.4 |
| 1% Adduct M-36CS | — | 1.8 |
| 1% Adduct M-36CS | 1.5% Lignosite 458 | 0.2 |

TABLE IX
ADSORPTION VALUES OF A PETROLUEM SULFONATE - SOLUBILIZER SYSTEM

| Surfactant System | Sacrificial Agent | mg surfactant g Manvel Sand |
|---|---|---|
| 0.55% TRS 18<br>1.45% TRS 40<br>0.60% Adduct N-60CS | — | 2.8 |
| 0.55% TRS 18<br>1.45% TRS 40<br>0.60% Adduct N-60CS | 2.6% Lignosite 458 | 0.6 |

TABLE X
COMPOSITION OF SIMULATED MALLET PRODUCED WATER

| Dissolved Solids | mg/l | Compounds | mg/l |
|---|---|---|---|
| Sodium, $Na^+$ | 16,400 | NaCl | 39,600 |
| Calcium, $Ca^{++}$ | 5,800 | $CaCl_2 \cdot 2H_2O$ | 21,500 |
| Magnesium, $Mg^{++}$ | 1,700 | $MgCl_2 \cdot 6H_2O$ | 14,200 |
| Chloride, $Cl^-$ | 39,400 | $Na_2SO_4$ | 1,800 |
| Sulfate, $SO_4=$ | 1,200 | $NaHCO_3$ | 700 |
| Bicarbonate, $HCO_3^-$ | 500 | | |

TABLE XI
COMPOSITION OF SIMULATED BOB SLAUGHTER BLOCK CONNATE WATER

| Dissolved Solids | mg/l | Compounds | mg/l |
|---|---|---|---|
| Sodium, $Na^+$ | 52,200 | NaCl | 131,600 |
| Calcium, $Ca^{++}$ | 12,300 | $CaCl_2 \cdot 2H_2O$ | 45,200 |
| Magnesium, $Mg^{++}$ | 3,400 | $MgCL_2 \cdot 6H_2O$ | 28,400 |
| Chloride, $Cl^-$ | 111,600 | $Na_2SO_4$ | 900 |
| Sulfate, $SO_4=$ | 600 | $NaHCO_3$ | 300 |
| Bicarbonate, $HCO_3^-$ | 200 | | |

TABLE XII
DESCRIPTION OF CHEMICALS

| Trade Name | Description |
|---|---|
| Sulframin 1240 | Sodium n-dodecyl benzene sulfonate |
| Sulfonated Surfonic N-40 | Sodium nonyl phenol polyoxyethylene (4 moles) sulfonate |
| Alipal CO-436 | Ammonium nonyl phenol polyoxyethylene (4 moles) sulfate |
| Kelzan MF | Polysaccharide |
| Sulfite lignosulfonates: | |
|   Marasperse C-21 | Calcium and sodium lignosulfonate (degree of sulfonation = 14.2%) |
|   Marasperse N-22 | Sodium lignosulfonate (degree of sulfonation = 13.7%) |
|   Marasperse BS-22-3 | Sodium lignosulfonate (degree of sulfonation = 16.8%) |
|   Marasperse BS-22-6 | Sodium lignosulfonate (degree of sulfonation = 17.7%) |
|   Lignosite | Calcium lignosulfonate (degree of sulfonation = 13.5%) |
|   Lignosite 854 | Sodium lignosulfonate (degree of sulfonation = 14.0%) |
|   Lignosite 458 | Sodium lignosulfonate (degree of sulfonation = 13.5%) |
| Carboxylated sulfite lignosulfonates: | |
|   Marasperse 22s-z | Sodium lignosulfonate (degree of sulfonation = 15.3%) |
|   Norlig 41s-z | Calcium lignosulfonate (degree of sulfonation = 14.5%) |
| Adduct D-40CS | Chain sulfonated 4 mole ethylene oxide adduct of dodecyl phenol |
| Adduct D-25HPS | Sodium-2-hydroxy-3(dodecylphenoxy polyethoxy)-propane-1-sulfonate |
| Adduct D-35CS | Chain sulfonated 3.5 mole ethylene oxide adduct of dodecyl phenol |
| Alipal CO-433 | Na sulfated 4 mole ethylene oxide adduct of nonyl phenol |
| Sipex EST 75 | Sulfated 3.5 moles EO adduct of tridecyl alcohol |
| Adduct M-36CS | Sulfonated 3.6 mole EO adduct of tridecyl alcohol |

*Degree of sulfonation is taken from manufacturer's literature.

I claim:

1. A method for recovering oil from a subterranean formation containing oil and having an injection well and a production well comprising
injecting into the injection well an aqueous solution comprising a mixture of lignosulfonate and a surfactant comprising alkyl benzene alkoxylated sulfonates having the following general formula:

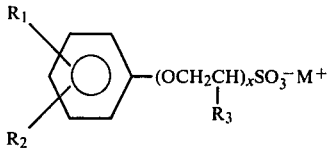 (I)

where $R_1$ and $R_2$ are hydrogen or alkyl with at least one being an alkyl group of from 6 to 20 carbon atoms, x is a number from 1 to 10, $M^+$ is a cation selected from the group consisting of lithium, sodium, potassium, ammonium and $R_3$ is either —$CH_3$ or hydrogen.

2. A method as in claim 1 wherein the solution of lignosulfonate and surfactant is preceded by an aqueous solution of lignosulfonate.

3. A method for recovering oil from a subterranean formation containing oil and having an injection well and a production well comprising injecting into the injection well an aqueous solution comprising a mixture of lignosulfonate and a surfactant comprising alkoxylated alkyl sulfonates having the following general formula:

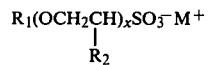

wherein $R_1$ is an alkyl group of from 8 to 22 carbon atoms, $R_2$ is either $CH_3$ or hydrogen and $M^+$ is a cation selected from the group consisting of lithium, sodium, potassium and ammonium, and x is a number from 1 to 10.

4. A method as in claim 3 wherein the solution of lignosulfonates and surfactant is preceded by an aqueous solution of lignosulfonates.

* * * * *